United States Patent [19]
Mikolajczyk

[11] 3,972,124
[45] Aug. 3, 1976

[54] DEVICE FOR MEASURING THE LENGTH OF A MEMBER

[76] Inventor: Raymond F. Mikolajczyk, Rte. L, Box 309-C, Lafayette, La. 70501

[22] Filed: Mar. 14, 1975

[21] Appl. No.: 558,565

[52] U.S. Cl. .............................. 33/134 R; 33/141 E; 308/238; 226/196
[51] Int. Cl.² .......................................... G01B 3/12
[58] Field of Search .............. 33/129, 141 R, 141 A, 33/134 R, 141 E, 132, 133; 308/238

[56] References Cited
UNITED STATES PATENTS

| | | | |
|---|---|---|---|
| 1,982,184 | 11/1934 | Williams et al. | 33/134 R |
| 2,208,975 | 7/1940 | Hait | 308/238 |
| 2,663,598 | 12/1953 | Verderber | 33/141 R |
| 2,707,332 | 5/1955 | Smith | 33/134 R |
| 3,018,146 | 1/1962 | Euwe et al. | 308/238 |
| 3,190,005 | 6/1965 | Smith et al. | 33/134 R |
| 3,308,544 | 3/1967 | White | 33/134 R |
| 3,579,842 | 5/1971 | Scher | 33/133 |

Primary Examiner—William D. Martin, Jr.
Attorney, Agent, or Firm—Jack W. Hayden

[57] ABSTRACT

A device for measuring the length of a tubular member as it is run into or pulled from a well bore includes a support means which defines ends in spaced relation. Elastomer members are secured on each of the ends with axially, aligned openings therein for mounting the support means on the tubular member, and a measuring wheel is mounted on the support means and is resiliently urged into engagement with the circumference of the tubular member as it is moved through the axially aligned openings in the elastomer ends.

8 Claims, 4 Drawing Figures

DEVICE FOR MEASURING THE LENGTH OF A MEMBER

SUMMARY OF THE INVENTION

Various pipe measuring devices have been provided and heretofore used in an endeavor to measure the length of pipe run into or removed from a well bore. It is desirable to know the exact length of pipe while drilling or completing a well so that the level at which desired operations are to be carried out in the well bore may be accurately known.

Devices heretofore provided for such measurements have been complicated, bulky and sometimes provide inaccurate measurements.

An object of the present invention is to provide a relatively simple mechanism which can measure the length of a tubular member as it is run into or pulled from a well bore, and which will function even though it may encounter tool joints and protectors or other devices which may be positioned on the tubular members.

An object of the present invention is to provide a relatively simple mechanism which can measure the length of a tubular member as it is run into or pulled from a well bore, and which will function even though it may encounter tool joints, and protectors or other devices which may be positioned on the tubular members, and one which can measure various diameter tubular members with a minimum of mechanical or other type adjustments.

DESCRIPTION OF THE PREFERRED EMBODIMENT

Figure 2:
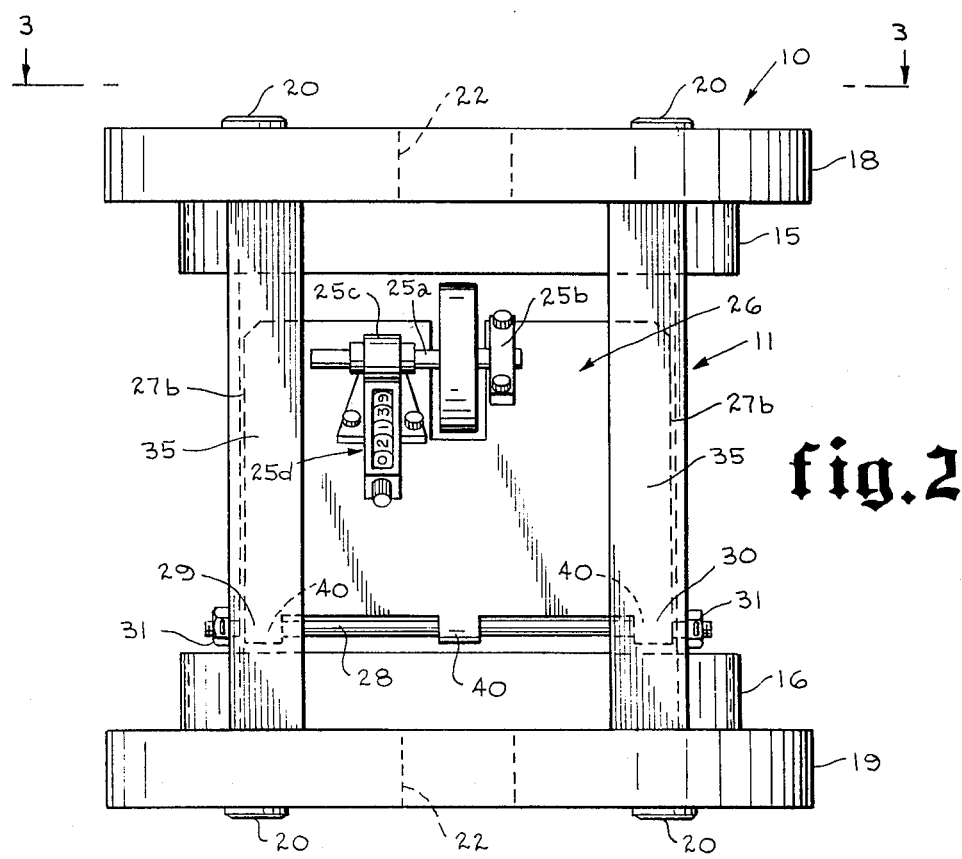
FIG. 2 is an enlarged front view of the device of the present invention.
Figure 3:
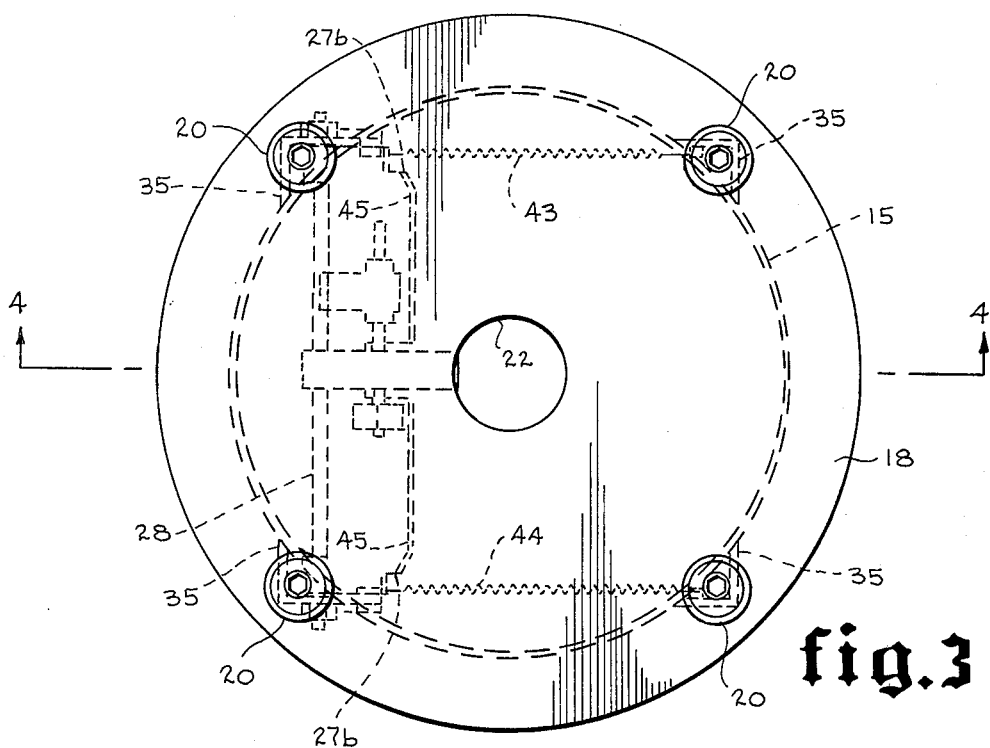
FIG. 3 is a top plan view of the device of the present invention.

Attention is first directed to FIG. 2 of the drawings wherein the device of the present invention is referred to generally by the numeral 10. It is shown as including support means referred to generally at 11 defining ends 15 and 16 in vertical, spaced relation.

Elastomer members 18 and 19 are secured on each of the ends 15 and 16 of the support means 11 by any suitable means such as bolts 20 or the like. The elastomer members 18 and 19 are each provided with an opening 22, the openings 22 being axially aligned and centrally disposed relative to support means 11 as shown in the drawings.

A measuring wheel 25 is mounted on the support means 11 by the means referred to generally at 26, such wheel measuring mounting means 26 being illustrated as in the form of a plate 27 which is pivotally secured to the support means 11 by means of the rod 28 extending along the lower edge 27d of plate 27. The rod 28 is secured to the support means 11 as illustrated at 29 and 30.

If desired the rod 28 may be secured to the support means 11 by means of the nuts 31 to enable such rod to be removed for repair or replacement of the measuring wheel 25 as such may be necessary.

The support means 11 may assume any suitable form and as shown in the drawings includes the longitudinal members 35, four of which are illustrated, which may be positioned in spaced circumferential relationship to each other as shown and are secured by any suitable means to each of the annular end members 15 and 16 such as by welding or the like. The support means 11 thus generally forms a hollow rigid box construction as shown in the drawings with the elastomer members 18 and 19 secured to each of the annular ends 15 and 16 at the juncture with members 35 by means of the bolts 20 as previously described.

The rod 28 may be secured through one of the members 35 and adjacent one of the annular end members 16 as shown in the drawings and extends through the vertically extending member 35 on the other side of the support 11 as shown in the drawings. The plate 27 is provided with portions 40 thereof which are bent to engage around the rod 28 whereby the plate 27 is pivotally mounted within the support means 11 as better illustrated in FIG. 4 of the drawings.

The support plate 27 is of less longitudinal extent than the vertical distance between the circular members 15 and 16 so that the device of the present invention may be employed with tubular members of various diameters as will be described.

Figure 1:
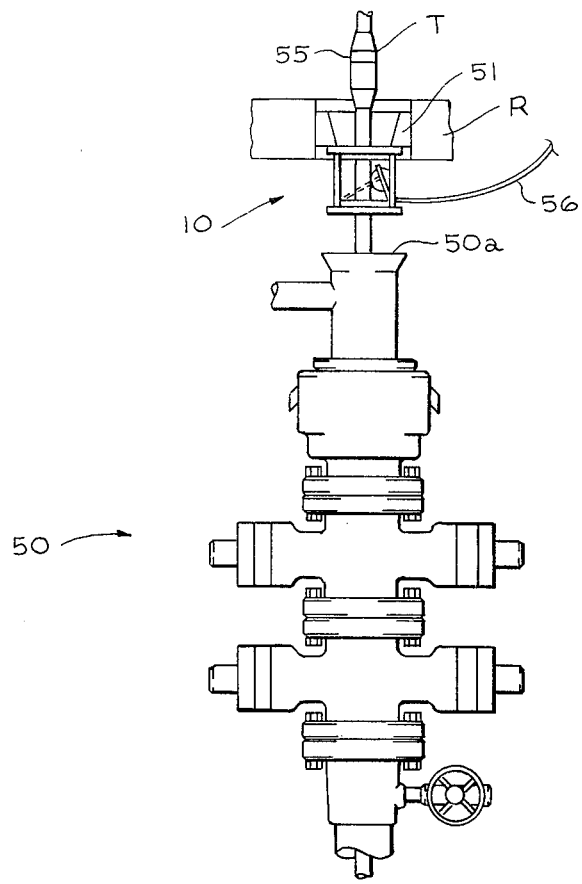
FIG. 1 is a schematic drawing illustrating the device of the present invention in position for use.
Figure 4:
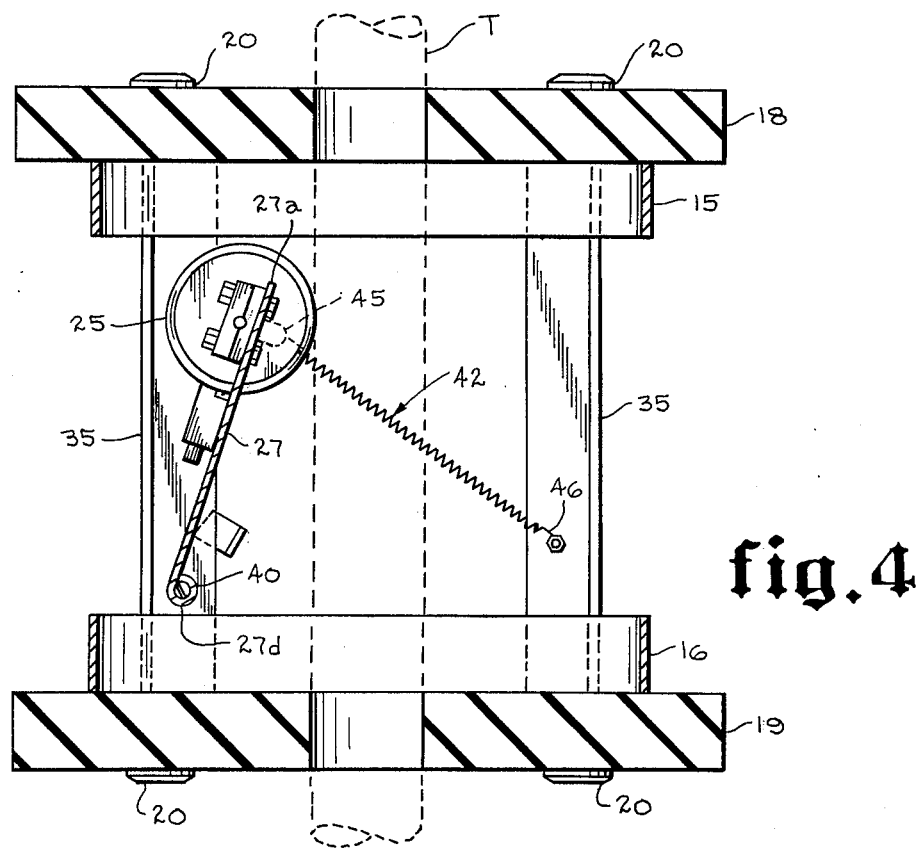
FIG. 4 is a sectional view on the line 4—4 of FIG. 3.

Resilient means referred to at 42 are provided for resiliently urging the measuring wheel 25 against the tubular member referred to by the letter T in FIGS. 1 and 4 of the drawings.

Such resilient means includes a pair of springs 43 and 44 which are secured at one end 45 adjacent the upper end 27a and side edges 27b of the plate 27 as shown in the drawings and are secured at their other end 46 to the member 35 on the opposite circumferential edge of support 11, preferably closer to the annular ring 16 than the annular ring 15 so as to tend to pull the measuring wheel 25 inwardly of support 11 into engagement with the tubular member T as shown in FIGS. 1 and 4 of the drawings.

More particularly, it will be noted that the plate 27 is provided with central opening 27a and that the wheel 25 is provided with an axle 25a. The axle 25a is supported by the bearing 25b at one end and extends through the housing 25c as shown in the drawings. The housing 25c includes a suitable gearing arrangement operatively connected with axle 25a for actuating the measuring instrument referred to generally at 25d. Since the circumference of the wheel 25 is known, the gearing arrangement in 25c is such that the instrument 25d will be converted directly to indicate or measure total feet and inches. The instrument 25d is provided with an arrangement for resetting it on zero, in a manner well known in the art.

The openings 22 in each of the elastomer members 18 and 19 at each end of the support 11 is of substantially the same diameter as the tubular member T, or tubular members to be moved through the device for obtaining the length thereof. Thus the elastomer members 18 and 19 serve to mount the support means 11 on the tubular member T and retain the device 10 and measuring wheel 25 in engagement with the tubular member T as the tubular member T is moved through the device.

For example a blow out preventer stack is referred to generally by the numeral 50, which is normally below the floor of a drilling derrick.

The device 10 of the present invention may be mounted in any suitable location, and is shown as being mounted between the top of the blow out preventer stack 50 and the bushings 51 in the rotary table R supported adjacent the rig floor. Since the diameter of the openings 22 is substantially the same as the diameter of the tubular member T being moved therethrough, the tubular member T is frictionally engaged within such openings 22 to retain the measuring device 10 in position on the pipe even though the pipe 10 may wobble from side to side in the rotary table R as it is either removed from or inserted in the well bore and through the device 10.

The springs 43 and 44 continuously pull the measuring wheel 25 into contact with the circumference of the tubular member T as it is moved though the device 10 even though it has protectors thereon.

In FIG. 1, the device 10 is shown in the position when the tubular member T is being pulled up out of the well bore, and in this position the device 10 will be moved upwardly against the bushing 51 in the opening of the rotary table R as shown in FIG. 1 of the drawings and held in such position by the friction of the pipe T in openings 22.

It will be noted that the tubular member T is provided with an enlargement referred to at 55 which is commonly called a connection, and the device of the present invention enables such enlargement to move therethrough while riding up over and measuring the length of such enlargement, thus giving an indication of the total length of pipe which has been in the well bore, including the length of the connections 55.

When the device of the present invention is to be employed as the tubular member T is lowered into the well bore, it is turned over, so that it assumes a position exactly 180° from top to bottom relative to that shown in FIG. 1 of the drawings.

As the tubular member T is lowered into the well bore, the device 10 will be pushed downwardly against the top 50a of the blow out preventer stack 50, but the elastomer members 18 and 19 and the size of the openings 22 will retain the device 10 on the tubular member T and will again measure the total length thereof while permitting enlargements such as the connections 55, or other enlargements such as pipe protectors, which may be mounted on the tubular member T, to move therethrough.

It can be appreciated that the present invention may readily be employed to measure pipes of various diameter, it being only necessary to change elastomer members 18 and 19 to provide openings 22 of different size so as to generally conform with and engage the outer diameter of the tubular member T being moved therethrough.

In some circumstances it may be desirable to record the reading of the total length of pipe either being inserted to or removed from a well bore and in such instance the drive shaft 56 may be connected to the gear mechanism 25c or to the instrument 25d in any manner well known in the art and in turn connected to suitable recording mechanism for recording the total length of pipe moved downwardly through the device and inserted into the well bore, or removed upwardly out of the well bore.

The foregoing disclosure and description of the invention are illustrative and explanatory thereof, and various changes in the size, shape, and materials as well as in the details of the illustrated construction may be made without departing from the spirit of the invention.

What is claimed is:

1. A device for measuring the length of a member comprising:
   a. support means defining ends in spaced relation;
   b. elastomer members on each of said ends having axially aligned openings for mounting said support means on the member whose length is to be measured;
   c. a measuring wheel;
   d. measuring wheel mounting means including means to support said measuring wheel for rotational movement;
   e. means for pivotally securing said measuring wheel mounting means to said support means; and
   f. means resiliently urging said measuring wheel into contact with the member to be measured.

2. The invention of claim 1 including instrument means operatively connected with said measuring wheel for instrumentally indicating the length of member moved through the device.

3. The invention of claim 1 wherein said wheel mounting means supports said wheel in axial alignment with the openings in said elastomer members.

4. The invention of claim 1 wherein said resilient means includes spring means connected at one end to said wheel mounting means in spaced relation on each side of said wheel and is connected at its other end to said support means to tend to urge said wheel into engagement with the member.

5. The invention of claim 1 wherein the diameter of the openings in said elastomer members is substantially the same as the outer diameter of the member on which the device is mounted.

6. The invention of claim 1 including means for removably securing said elastomer members on said support means.

7. The invention of claim 4 wherein said pivotal securing means is adjacent one end of said support means and wherein said other end of said spring means is secured adjacent the same end of said support means.

8. The invention of claim 1 wherein said support means includes a pair of annular end members positioned in spaced relation by a plurality of longitudinal members secured in circumferential spaced relation to said annular end members.

* * * * *